United States Patent
Schnell

(10) Patent No.: US 6,199,133 B1
(45) Date of Patent: *Mar. 6, 2001

(54) MANAGEMENT COMMUNICATION BUS FOR NETWORKING DEVICES

(75) Inventor: Arnold Thomas Schnell, Pflugerville, TX (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/624,176

(22) Filed: Mar. 29, 1996

(51) Int. Cl.[7] .................................................. G06F 13/00
(52) U.S. Cl. .................. 710/110; 710/105; 710/109; 710/113; 710/129; 709/208; 712/20
(58) Field of Search .................................. 395/259, 290, 395/293, 200.05, 285, 474, 476, 325; 710/109, 110, 113, 105, 129; 709/208; 712/20

(56) References Cited

U.S. PATENT DOCUMENTS

| | | | |
|---|---|---|---|
| 4,825,438 | * | 4/1989 | Bennett et al. .......................... 714/56 |
| 4,866,604 | * | 9/1989 | Reid . |
| 5,131,085 | * | 7/1992 | Eikill et al. . |
| 5,255,373 | * | 10/1993 | Brockmann et al. ................. 395/325 |
| 5,255,375 | * | 10/1993 | Crook et al. . |
| 5,276,818 | * | 1/1994 | Okazawa et al. . |
| 5,309,563 | * | 5/1994 | Farrand et al. . |
| 5,459,840 | * | 10/1995 | Isfeld et al. .......................... 710/129 |

FOREIGN PATENT DOCUMENTS

| | | |
|---|---|---|
| 0 495 575 A1 | 1/1992 | (EP) . |
| WO 95/16318 | 6/1995 | (WO) . |
| WO 97/01904 | 1/1997 | (WO) . |

OTHER PUBLICATIONS

"Dedicated Network Management Through Port Segmentation" IBM Technical Disclosure Bulletin, vol. 38, No. 05, May 1995, pp. 75–78.

De Souza et al., "Emerging Architectures for 10BaseT Environments", Wescon Conference Record, vol. 35, Nov., 1991, pp. 222–229.

EPO Search Report dated Jun. 5, 1998.

* cited by examiner

Primary Examiner—Glenn A. Auve
Assistant Examiner—Rupal D. Dharia
(74) Attorney, Agent, or Firm—Akin, Gump, Strauss, Hauer & Feld, LLP

(57) ABSTRACT

A management communication bus for enabling management of network devices in a network system. The network system includes at least one bus master device and at least one slave device, where the bus master and slave devices are distributed within the network devices. Each network device includes a slave device or a bus master device or both. The bus includes several conductors for state signals for defining four states for arbitration, for slave identification, for asserting an address and for asserting data corresponding to the address. The bus further includes several conductors for data signals for transferring information data depending upon the different states, where the information data includes bus request, slave identification, the address and the data corresponding to the address. Each bus master includes an interface to the bus to step through each of the states for controlling each cycle. Each bus master and slave device includes an identification number with a predetermined priority.

29 Claims, 6 Drawing Sheets

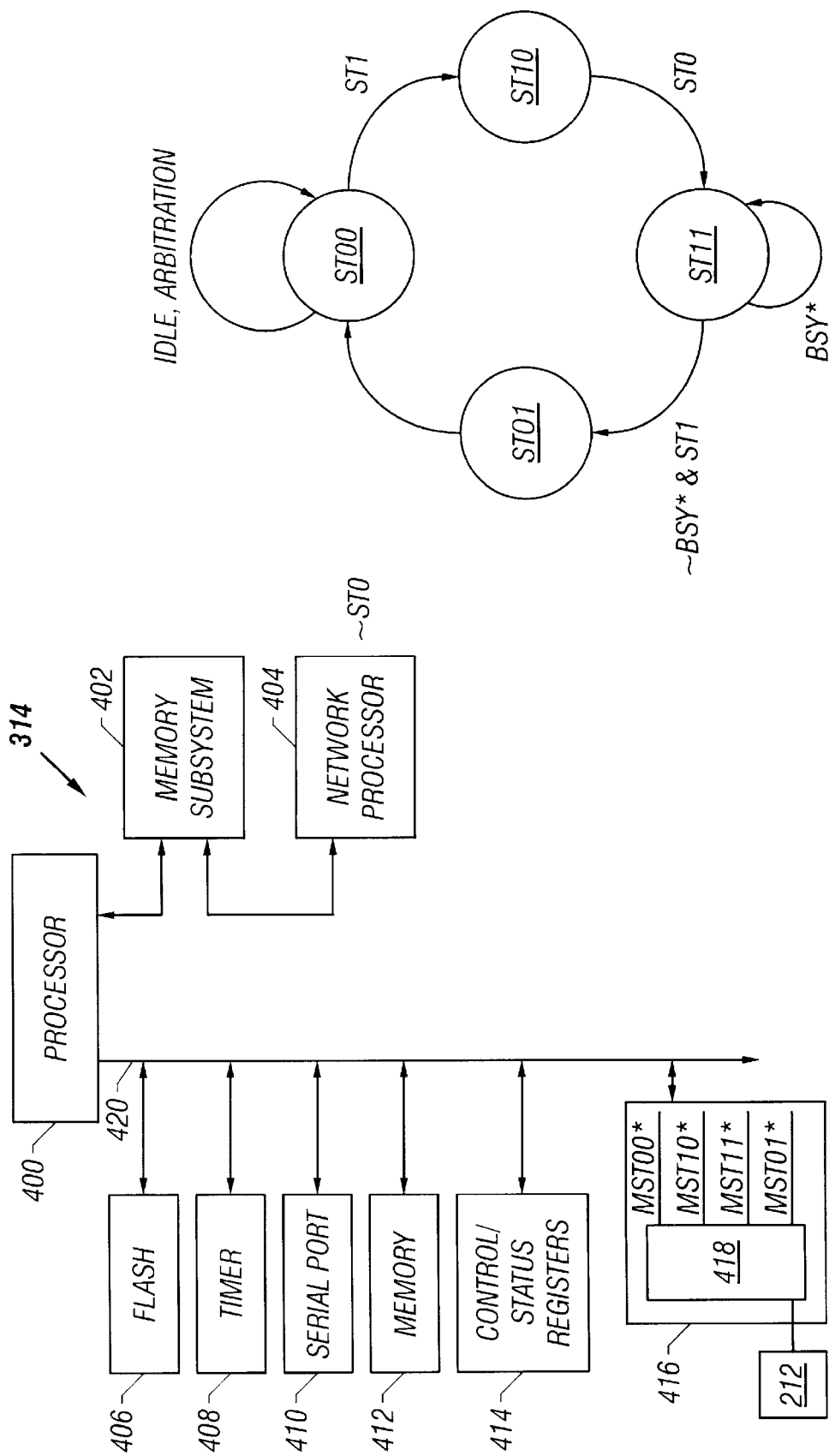

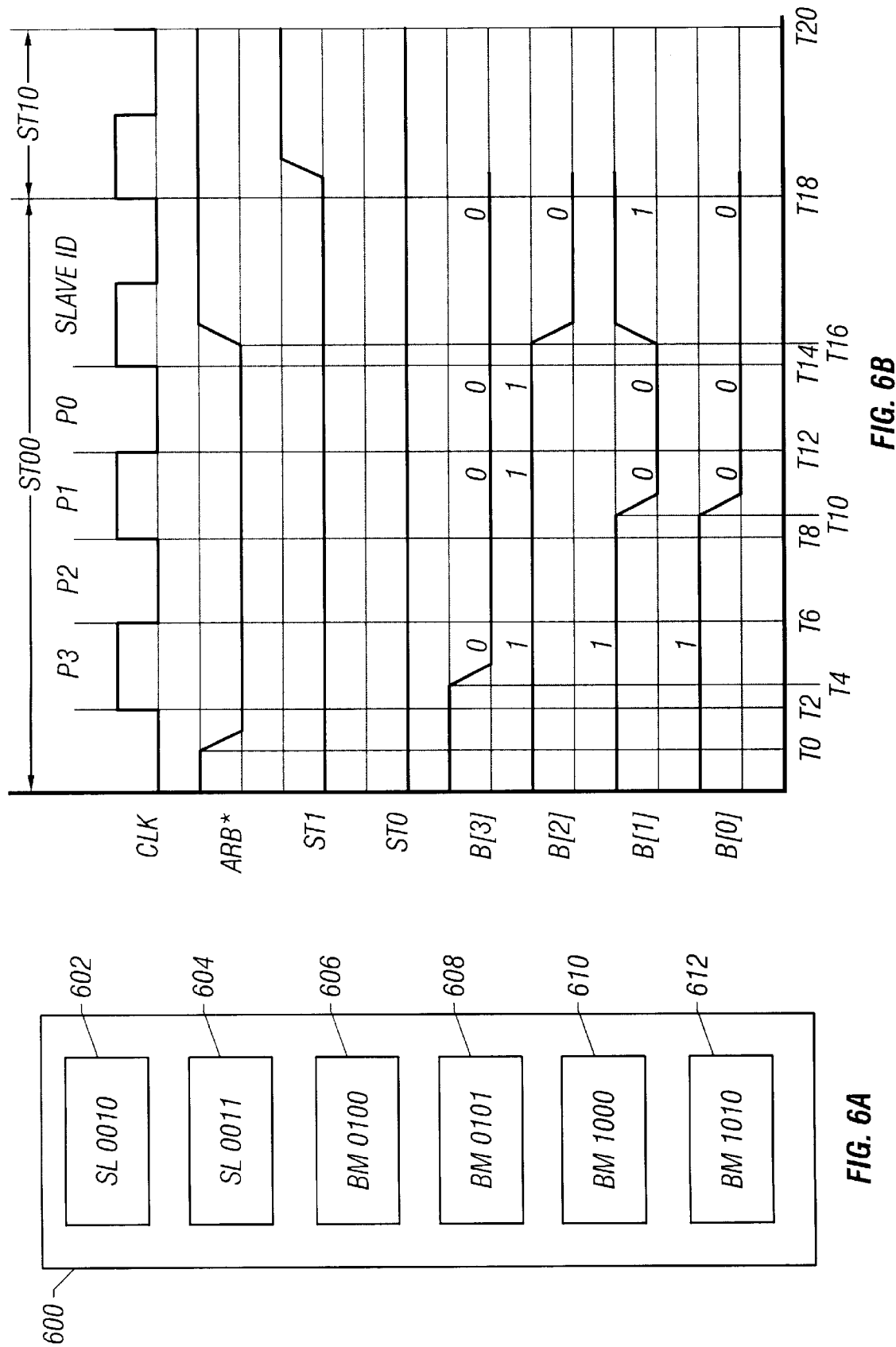

MANAGEMENT COMMUNICATION BUS FOR NETWORKING DEVICES

FIELD OF THE INVENTION

The present invention relates to the field of networking devices, and more particularly to a management communication bus for networking devices.

DESCRIPTION OF THE RELATED ART

There are many different types of networks and network systems for sharing files and resources or for otherwise enabling communication between two or more computers. Networks may be categorized based on various features and functions, such as message capacity, range over which the nodes are distributed, node or computer types, node relationships, topology or logical and/or physical layout, architecture based on cable type and data packet format, access possibilities, etc. For example, the range of a network refers to the distance over which the nodes are distributed, such as local-area networks (LANs) within an office or floor of a building, wide-area networks (WANs) spanning across a college campus, or a city or a state, global-area networks (GANs) spanning across national boundaries, etc. The architecture of a network generally refers to the cabling or media and media access used as well as the packet structure of the data transmitted across the media. Various architectures are common, including Ethernet using coaxial, twisted pair or fiber-optic cables for operation at 10 megabits per second (Mbps) (e.g. 10Base-T, 10Base-F) or fast Ethernet operating at 100 Mbps (e.g. 100Base-T, 100Base-FX). ARCnet (Attached Resource Computer Network) is a relatively inexpensive network architecture using coaxial, twisted pair or fiber-optic cables for operation at 2.5 Mbps. Token Ring or Token Bus uses special IBM cable or fiber-optic cable for operation between 1–16 Mbps. Of course, many other types of networks are known and available.

Each network generally includes two or more computers, often referred to as nodes or stations, which are coupled together through selected media and various other network devices for relaying, transmitting, repeating, translating, filtering, etc., the data between the nodes. The term "network device" generally refers to the computers and their network interface cards (NICs) as well as various other devices on the network, including repeaters, bridges, switches, routers, brouters, to name a few examples.

It is desired to monitor and/or configure each of the network devices for purposes of managing that network. For example, it may be desired to enable or disable and configure each of the ports of a multi-port device, such as a repeater. Also, it may be desired to monitor the status of the ports or to monitor and retrieve statistical data about one or more ports on a network device. Thus, management data must be communicated between the network devices. Each of the network devices may be configured to communicate with other network devices through their respective network channels and protocols for purposes of management. However, if the network channels or protocols are incompatible, then some type of converter or bridge device would be required to enable such communication. For example, a bridge would typically be required to enable a 10Base-T and a 100Base-T device to communicate with each other. Such converter devices add significant and undesirable cost to the system. Furthermore, such communication is typically packetized requiring additional overhead to encode the data into packets and send the data on its network to another device. The receiving device must then retrieve the packet and decode the data, which requires additional overhead. More importantly, it is not desired to consume valuable time and resources on the respective networks by increasing traffic with management functions. Also, not all of the network devices are sources or destinations of data and simply receive and re-send data. For example, an Ethernet repeater does not receive and decode packets, but simply repeats the packet on its other ports. Thus, the repeater would require modification of its network logic to enable management functions.

One possible solution is to add a common network protocol to each of the devices, such as ARCnet or the like, so that each device becomes a node on a separate management network. However, such a network must be relatively inexpensive and yet have enough data throughput to achieve the desired management functions. Although ARCnet is a relatively inexpensive architecture, it requires significant overhead for encoding and decoding packets and inserting wait states, thereby decreasing actual overall data throughput to approximately 1 Mbps.

Another possible solution is to incorporate a known input/output (I/O) bus structure to all of the network devices, such as the 8-bit PC bus, the industry standard architecture (ISA) or AT bus, the Extended ISA (EISA) bus, the Micro Channel Architecture ® by IBM (MCA), the peripheral component interconnect (PCI) bus, etc. Each of these bus structures provide memory mapped transactions and would enable sufficient throughput for the desired management functions of network devices. However, such bus structures are also relatively expensive and require a significant amount of bus signals. An 8-bit PC bus, for example, requires at least 31 pins or signals, and the 16-bit ISA bus adds at least 18 more pins to the PC bus. The EISA bus adds 55 signals to the ISA bus. The MCA bus includes at least 46 pins for its basic 8-bit section.

Another possible solution is to use a serial channel for communications. However, serial communications are relatively expensive for the amount of data throughput available. Common throughput rates are 9600, 14,400, 19,200 and 28,800 bits at unit density (baud). Higher baud and/or bit rates may be available, but at significant increase in cost.

It is desired to provide a management communication scheme for managing network devices at the desired data throughput without adding significant cost to a network system.

SUMMARY OF THE INVENTION

A management communication bus according to the present invention enables management of a plurality of network devices of a network system. The network system includes at least one bus master device and at least one slave device, where the bus master and slave devices are distributed within the network devices as desired. Thus, each network device includes a slave device or a bus master device or both. The bus includes several state signals for defining at least three states for arbitration, for slave identification, for asserting an address and for asserting data corresponding to the address. The bus further includes several data signals for transferring information data depending upon the different states, where the information data includes bus request, slave identification, the address and the data corresponding to the address. In the preferred embodiment, the bus includes a clock signal for purposes of synchronization. The clock signal is preferably approximately eight megahertz (MHz). Also, the bus preferably includes two state signals for defining at least four states, and eight data signals, where a bus master accesses up to 16 kilobytes (KB) of data per slave at a data throughput rate of 1.14 Mbps.

Preferably, arbitration and slave identification occurs during a first state, an address is asserted in two portions during second and third states, respectively, and a data cycle is performed during a fourth state. During the first address state, the controlling bus master device asserts a cycle definition signal on a bus data signal to indicate whether the operation is a read or a write cycle. During the second address state, a slave device being accessed may assert a busy signal on a bus data signal to indicate that the slave device is busy, where the bus master keeps the bus in the second address state until the slave device is ready to proceed to the data cycle. Each bus master includes an interface to the bus to step through each of the states thereby controlling each cycle. The bus master preferably asserts only one of the state signals at a time.

Preferably, a plurality of bus masters and slave devices are coupled to the bus, each including an interface device for controlling operations. The bus masters include a bus master interface for controlling state transitions, for asserting an address and for either asserting or receiving and latching the data. Each slave device also includes a slave interface for detecting the cycle definition signal and for asserting data during a read cycle and for receiving data during a write cycle. Each slave device further includes memory for storing data retrieved from the bus during write cycles or for providing status or other data to be asserted onto the bus during read cycles. Each bus master may delay any bus state. Each slave interface asserts the busy signal, if necessary, to delay the address cycle before proceeding to the data cycle.

Each bus master device includes an identification number with a predetermined priority. The bus master interface asserts an arbitration signal to initiate arbitration, and then asserts a binary equivalent of its identification number on the bus data signals to arbitrate for the bus. The bus master asserting a highest priority identification number gains control of the bus. Several arbitration variations are possible for determining the bus master with the highest priority. Several phases are defined in the first state based on transitions of a clock signal. In one embodiment, during each phase, each bus master asserts its next significant identification bit and then compares its more significant bits with corresponding bits on the bus to determine whether it has priority or not. If not, that master drops out of the present arbitration. In a second embodiment, each bus master asserts its consecutive leading identification bits equal to a predetermined priority logic level beginning with a bit corresponding to each phase. In subsequent phases, each bus master compares its upper identification bits equal to the opposite logic level with corresponding bits asserted on the bus, and if the bits match, the bus master further asserts more of its bits during subsequent phases. In the final phase, no further bits are asserted and each bus master compares its identification number with that asserted on the bus. The participating bus master with a match in a final phase wins and assumes control of the bus. In the preferred embodiment, the identification numbers are four bits and arbitration occurs in four phases.

Each slave device also includes an identification number. The winning bus master asserts the identification number of the slave device that it wishes to access on the bus, and all of the slave devices compare the number asserted on the bus with their identification number. The slave device detecting a match participates in that cycle. In the preferred embodiment, one identification number not assigned to any slave device is a global identification number, where the bus master executes a write cycle to all of the slave devices on the bus.

In the preferred embodiment, a chassis is provided, which includes a plurality of slots and a plurality of slot connectors mounted to the chassis, where each of the slot connectors are aligned with a corresponding one of the slots. A management communication bus according to the present invention is electrically coupled to each of the slot connectors. The bus master and slave devices are incorporated into one or more modules configured to plug into the slots of the chassis, where each module includes a module connector for interfacing a corresponding one of the slot connectors coupled to the bus. Each module configured as a network device preferably includes a media interface device and port control logic as well as a slave interface and corresponding buffers, registers, latches and memory.

Preferably, a processor is coupled to the port control logic and the slave interface and memory for transferring data between the network device and the slave interface to enable access and control of the network device by an external bus master. The network module also preferably includes an interface or connector for receiving a bus master, so that the network module may include both a master and a slave device in the same slot. Of course, the module may be configured as a dedicated bus master and include only a bus master device. In this manner, two or more modules configured as a bus master or slave or both are plugged into the slots of the chassis and are automatically connected to the management bus. Each slot may be hardwired with an associated identification number for both masters and slaves. Alternatively, the identification numbers may be programmed and independent of the physical slots.

BRIEF DESCRIPTION OF THE DRAWINGS

A better understanding of the present invention can be obtained when the following detailed description of the preferred embodiment is considered in conjunction with the following drawings, in which:

FIG. 4 is a block diagram of a bus master device according to the present invention;

FIG. 5 is a state diagram illustrating bus states of a management communication bus according to the present invention;

FIG. 6A is a block diagram of a particular embodiment for illustrating arbitration;

FIG. 6B is a timing diagram illustrating arbitration of the embodiment shown in FIG. 6A.

DETAILED DESCRIPTION OF THE PREFERRED EMBODIMENT

Figure 1:
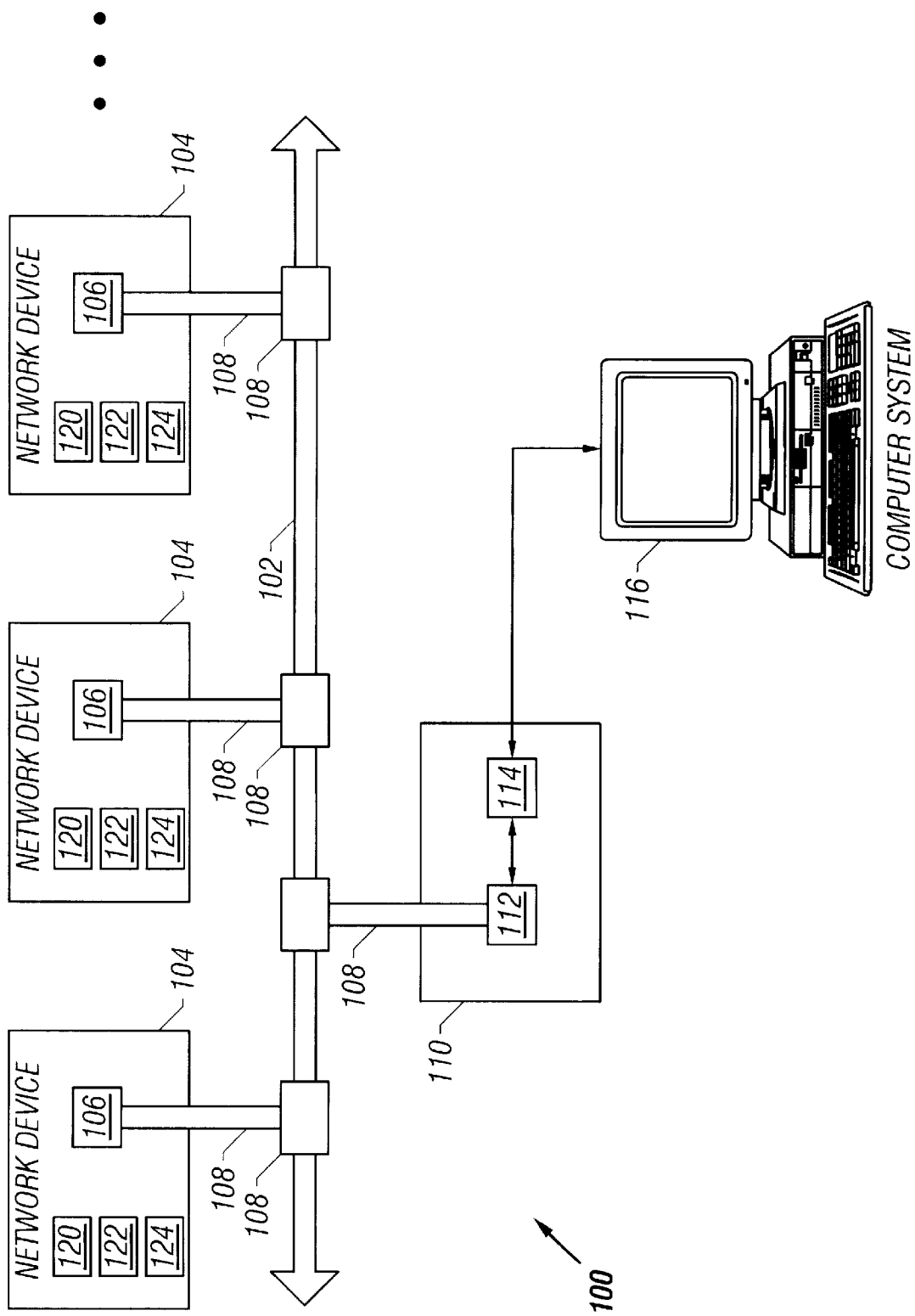
FIG. 1 is a simplified block diagram illustrating a network system including a management communication bus according to the present invention.

Referring now to FIG. 1, a simplified block diagram is shown illustrating a network system 100 including a management communication bus 102 implemented according to the present invention. The bus 102 includes a plurality of independent transmission media for a corresponding plurality of bus signals. One or more network devices 104 are shown, each including a bus interface device 106 for coupling to and interfacing with the bus 102. An appropriate bus connector 108 electrically couples the interface device 106 to each of the signals of the bus 102. Each interface device 106 is implemented as a bus master device, a bus slave device, or both. In general, a bus master is a device which gains control of a bus for initiating and controlling cycles or transactions on the bus. A slave device generally responds to signals or transactions occurring on the bus to receive data from or otherwise provide data to the bus master. For example, a bus master gains control of the bus to perform a read cycle to retrieve data from a slave, and the slave device respondingly provides the addressed data on the bus for retrieval by the bus master.

In one embodiment according to the present invention, the interface device 106 of one or more of the network devices 104 are configured as bus master devices, while the remaining interface devices 106 of the remaining network devices 104 are configured as slaves. In yet another embodiment, any one or more of the interface devices 106 may be configured as both bus masters and slaves. Additionally, an optional dedicated bus master 110 is shown, which includes a bus master interface 112 and bus connector 108 for interfacing with the bus 102. The bus master 110 is either a stand-alone system or optionally includes another input/output (I/O) interface 114 for communicating with a computer system 116.

Each of the network devices 104 may be implemented as any one of several different network device types known to those skilled in the art, such as hubs, concentrators, switches, bridges, repeaters, network interface cards (NICs), etc. The network devices 104 may be single port or multiport and may operate according to any one or more protocols or architectures, such as, for example, Ethernet (10Base-T, 100Base-T, 100Base-FX, etc.), Token Ring, VG (voice-grade), ARCnet, FDDI (Fiber Distributed Data Interface), CDDI (Copper Distributed Data Interface), ATM (Asynchronous Transfer Mode), etc. Further, the network devices 104 may be configured according to any type of network physical or logical topology, such as linear, bus, star, ring, star-wired ring, etc. The present invention is not limited to any particular type or configuration of network or network device. Furthermore, any one or more of the network devices 104 could by hybrid type devices operating according to multiple protocols, so that the network devices 104 need not all be the same type.

It is desired to monitor and control the network devices 104 for purposes of management. For example, one of the network devices 104 could be a multi-port Ethernet 10Base-T repeater, where it is desired to enable or disable one of the ports on that repeater. Or, it may be desired to monitor one of the ports on that repeater for gathering statistical information of that port for any purpose, such as data flow control. Each network device 104 preferably includes one or more status registers 120 for indicating the status of that device. Each network device 104 also preferably includes one or more configuration registers 122 for programming and configuring that network device. Furthermore, each network device 104 preferably includes memory 124 for monitoring the operation or otherwise collecting statistical data of the particular network to which that device is connected.

The management communication bus 102 enables a bus master, such as the bus master 110, to perform management functions, such as monitoring the status and programming the configuration of one or more of the network devices 104. In this manner, each of the network devices 104 are managed and controlled by a bus master, such as the bus master 110. The bus master 110 may perform these functions automatically according to predetermined management guidelines, or may be controlled by an external device, such as the computer system 116. Further, an operator may control each of the network devices 104 using the computer system 116. In this manner, a remote device coupled to a network device 104 including bus master capabilities may perform management functions by sending configuration commands or retrieving status or other information from the other network devices through the bus 102. As described previously, any one or more of the interface devices 106 may also be configured as a bus master device for controlling the network devices 104.

The bus 102 generally includes a plurality of independent transmission media for carrying the bus signals. Many physical implementations are possible. The transmission media may be of any type, such as conductive wire, fiber optic cable, etc. For example, the bus 102 could be implemented as a ribbon cable with electrical connectors for interfacing the connectors 108. Alternatively, the bus 102 could be implemented on a printed wiring board (PWB) with several slot connectors, where the connectors 108 are configured to plug into the slots of the bus 102 to enable communication. The bus 102 also includes one or more ground signals for reference, if necessary. The bus 102 operates either synchronously or asynchronously. For synchronous operation, a clock signal is also provided on the bus 102, which preferably operates at a frequency of approximately 8 megahertz. (MHz).

Figures 2A, 2B:
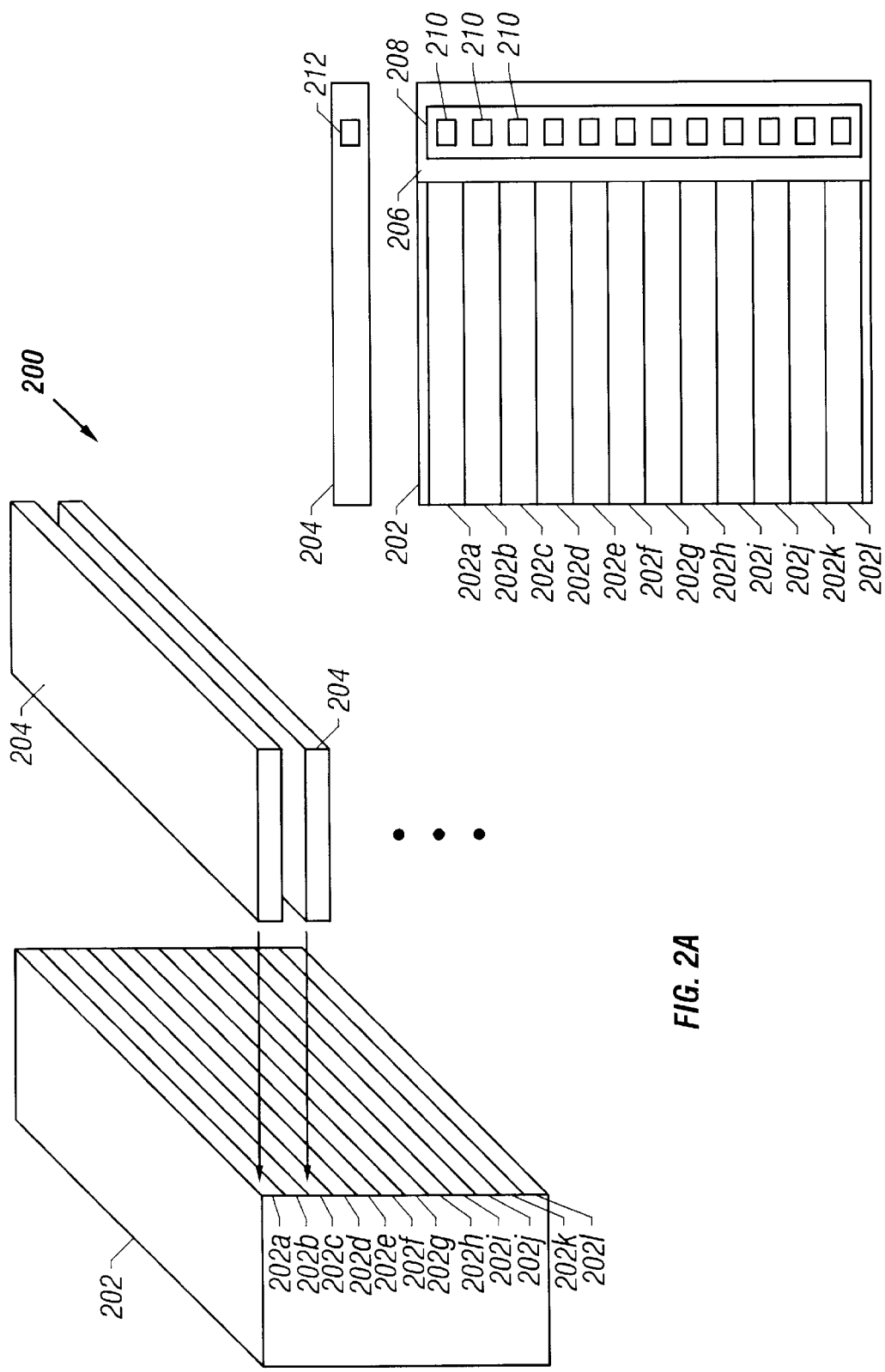
FIG. 2A is a perspective view of a modularized embodiment of a network system according to the present invention.
FIG. 2B is a backside view of the chassis and an exemplary module of FIG. 2A.

In the preferred embodiment, the bus 102 is implemented on a backplane 206 of a chassis 202, shown in FIG. 2A. FIG. 2A is a perspective view of a modularized embodiment of a network system 200 according to the present invention. The chassis 202 is preferably a box-like structure including a plurality of slots 202a, 202b, 202c. . . 202l, where each slot is configured for receiving a module 204. Preferably, twelve slots 202a–l are included, although the chassis 202 may include any number of slots as desired. The modules 204 include network devices, such as the network devices 104, or bus master devices, such as the bus master 110, and are configured to plug into any one of the respective slots 202a–l of the chassis 202. The chassis 202 provides convenient access for each of the modules 204 to a bus, such as the bus 102. The chassis 202 also provides a convenient ground reference for all the modules 204, so that the bus 102 need not include a separate ground conductor.

FIG. 2B is a backside view of the chassis 202 and an exemplary module 204 of FIG. 2A. The chassis 202 includes a backplane 206 incorporating a management communication bus 208 according to the present invention. The backplane 206 may include other buses, memory or logic as desired. The bus 208 is similar to the bus 102 and includes the same or similar bus signals, and is configured to align with the slots 202a–l of the chassis 202. The bus 208 includes a plurality of connectors 210, one for each of the slots 202a–l. Each of the modules 204 includes a compatible bus connector 212 for interfacing any one of the connectors 210 when plugged into a corresponding one of the slots 202a–l. In this manner, a network device incorporated into a module 204 is coupled to the bus 208 when plugged into any one of the slots 202a–l.

Figure 3:
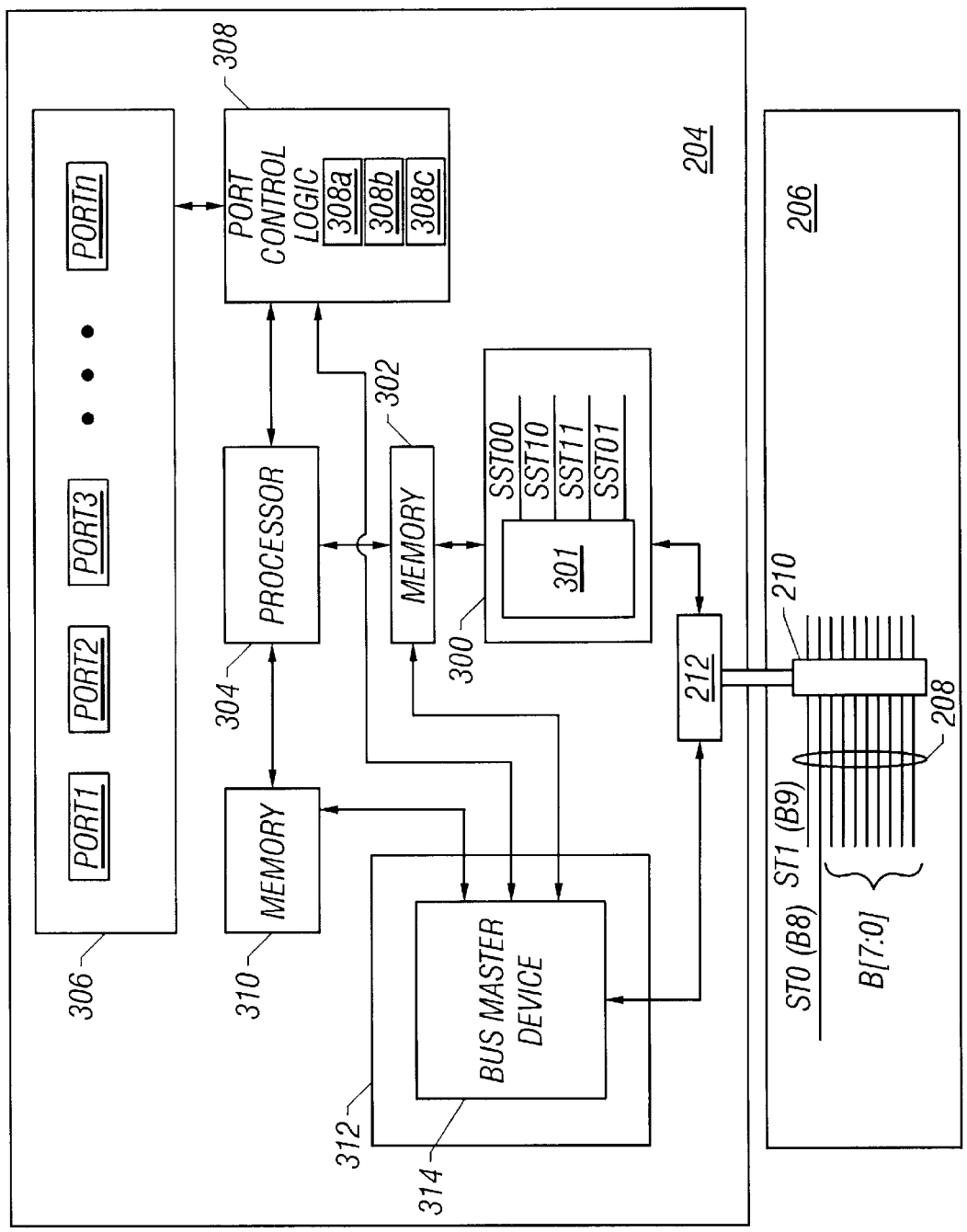
FIG. 3 is a block diagram of a module incorporating slave and bus master functions according to the present invention.

FIG. 3 is a more detailed block diagram of the module 204 and the bus 208 of FIG. 2B. The backplane 206 preferably includes the bus 208 and a connector 210 for coupling to the connector 212 of the network module 204. The connector 212 is connected to a slave interface 300, which includes slave logic and/or latches for communicating information with other modules 204 in the chassis 202. Preferably, each slave interface includes storage devices 301, such as 74HC373 transparent latches by Texas Instruments, Inc. (TI), or the equivalent. Depending upon timing requirements, buffers may also be used to forward data to a storage device further inside the module 204, such as within a local processor 304 or a memory 302. The slave interface 300 monitors cycles on the bus 208 to determine if it is being accessed, and if so, either provides data to, or reads data from, the bus 208, as further described below. The memory 302 is coupled to the slave interface 300 for storing data from the bus 208 and for retrieving data for assertion on the bus 208. The memory 302 is preferably a dual-port 2K by 8-bit (16 Kb) static random access memory (SRAM) having one port coupled to the slave interface 300 and another port coupled to the processor 304. The processor 304 is preferably an 80C51 or the like, which receives configuration commands from the bus 208 and also deposits statistical information into the memory 302 during operation.

A media interface device 306 with n ports, namely, Port1, Port2, ... Portn, is the primary network device of the module 204 for interfacing a corresponding network. For example, the media interface device 306 could be a 100Base-TX repeater or the like which receives packets on any of the ports Port1-Portn and repeats the packet to the remaining ports. The media interface device 306 is coupled to port control logic 308, which includes one or more control or configuration registers 308a, status registers 308b and any other static or dynamic memory 308c as desired. The media interface device 306 receives its configuration information from one or more configuration registers 308a and returns status information via one or more status registers 308b within the port control logic 308. For Ethernet, the port control logic 308 may include the ring interface chip (RIC) by National Semiconductor, for example. The port control logic 308 is coupled to the processor 304, which is further coupled to another memory 310. The memory 310 is preferably non-volatile RAM for storing product number, serial number and configuration information of the module 204, which information remains valid after power is removed. The processor 304 generally operates to transfer data and information between the port control logic 308 and the memories 302, 310.

In this manner, a bus master device coupled to the bus 208 controls the configuration of the media interface device 306 by executing a write cycle to write new configuration information to the bus 208 and addressing the module 204. The processor 304 transfers this information to the configuration registers 308a in the port control logic 308, which is then retrieved by the media interface device 306. Statistical data and status information is written to the status registers 308b and the memory 308c within the port control logic 308, which data is transferred to the memory 302 during operation. A bus master retrieves this information by executing a read cycle on the bus 208, where the slave interface 300 provides the data to the bus 208 in response.

In the preferred embodiment, the module 204 includes a connector or slot 312 for receiving an optional bus master device 314. The bus master device 314 is optionally coupled to the memories 302, 310, the port control logic 308 and the connector 212 through appropriate conductors of the slot 312. However, the bus master device 314 may also be stand-alone. If the bus master device 314 is included, the module 204 operates as both a bus master and slave device on the bus 208. The module 204 may serve as both master and slave at the same time, since the bus master device 314 may execute a cycle on the bus 208 to the slave interface 300. It is further noted that the module 204 may also be a bus master alone, where the slave interface 300 is not included. If the bus master device 314 includes a processor and memory, the processor 304 and the memories 302, 310 would also not be necessary. Also, the media interface device 306 and the port control logic 308 are not required on a bus master module, where the module 204 would then be a dedicated bus master device, similar to the dedicated bus master 110 of FIG. 1. It is understood that the present invention is not limited to any particular configuration of the modules 204 and encompasses all of these configurations.

The bus 208, as well as the bus 102, are each implemented as a management communication bus according to the present invention. Each bus master and slave device is also implemented to communicate on the bus 208 or 102 in accordance with the present invention. The structure and operation of the bus 102 and 208 are now more fully described and collectively referred to as the bus 208 for simplicity. The bus 208 provides memory-mapped accessibility to 16 Kbytes (KB) of memory per slot, where each slot is either a connector, such as the connector 108, or one of the slots 202a–l, as shown for the chassis 202 embodiment shown in FIGS. 2A and 2B. Each slot is associated with a slot identification (id) number, which is either hard-wired according to the physical slot or programmable using memory. The slot id number is preferably a 4-bit number SS[3:0] (slave slot) for identifying up to a maximum of 16 slave devices coupled to the bus 208. In the preferred embodiment, however, only 12 slots are used, where a higher numbered "slot" is used as a global access for writing to all the slave devices in one bus cycle. The global slot number is preferably decimal 14, or Eh ("h" for hexadecimal), or SS[3:0 ]=1110b ("b" for binary). The bus 208 preferably includes ten pins or bus signals B[9:0], including two state signals ST1, ST0 or bus signals B[9,8] for defining at least three different states, and eight information data bits or bus signals B[7:0], as shown in FIG. 3 and in the following Table I:

TABLE 1

Bus 208 Signal Definitions

| ST1 (B[9]) | ST0 (B[8]) | State | Data bits (B[7:0]) |
|---|---|---|---|
| 0 | 0 | ST00 | IDLE; ARB*, , , , MRQ[3:0]/SS[3:0] |
| 1 | 0 | ST10 | WR, A[6:0] |
| 1 | 1 | ST11 | BSY*, A[13:7] |
| 0 | 1 | ST01 | D[7:0] | where an asterisk "*" following a signal name denotes negative logic, where the signal is considered asserted when low.

The two state bits ST1 and ST0 define at least three different states, where the definitions of the eight bus signals B[7:0] change with the particular state of the bus 208. Of course, additional signals could be added to define additional states. A first state is an identification state including arbitration for identifying a bus master to control the bus 208 and a slave device that the winning bus master wishes to access. A second state is an address state for asserting an address and a third state is a data state for performing a data cycle on the bus 208. In the preferred embodiment, the address state includes two different states for asserting first and second portions of the address. As shown in Table I, the two state bits ST1 and ST0 preferably define four different states ST00, ST10, ST11 and ST01 of the bus 208.

A term "IDLE" indicates the bus 208 is idle; a signal ARB* is preferably high when the bus 208 is idle and asserted low on the B[7] signal during state ST00 to initiate an arbitration; signals MRQ[3:0] (master request) represent bus master id numbers which are asserted on bus signals B[3:0] during state ST00 by respective bus masters requesting control of the bus 208; signals SS[3:0] indicate the slot id number of a slave device, which id number is asserted on bus signals B[3:0] by the winning bus master during state ST00 to access a slave device; a signal WR is a cycle definition signal which is asserted on bus signal B[7] in state ST10 to indicate a write cycle when asserted high and a read cycle when asserted low; a signal BSY* is asserted by a slave device on bus signal B[7] in state ST11 to delay an address cycle before beginning a data cycle; signals A[13:0] are address signals asserted by the winning bus master during states ST10 and ST11; and signals D[7:0] are data signals asserted during state ST01.

Referring now to FIG. 4, a more specific block diagram is shown of an embodiment of the bus master device 314 of FIG. 3. Preferably, the bus master device 314 is an enhanced management processor, which is further an embedded application for gathering statistical information and fault conditions of a network, for building a management information base (MIB), and for reporting the MIB information to a management software client. The bus master device preferably includes a processor 400, which is preferably a 3051 RISC (reduced instruction-set computer) type processor, such as the IDT3051. The processor 400 preferably includes a memory subsystem 402, which preferably comprises between 1 to 8 Mbyte dynamic RAM (DRAM). A network processor 404 is preferably incorporated into a network node, where the processor 404 copies full or partial packets into the memory subsystem 402. The processor 404 also sends packets constructed by the processor 400 across a network to a management console or the like.

The bus master device 314 also preferably includes flash memory 406 containing code for an embedded application; a timer 408 for providing DRAM refresh, periodic interrupt of the processor 400 and a watchdog timer; a serial port 410 for direct communication of the processor 400; a nonvolatile memory 412 for storing configuration and identification information and embedded application variables; control and status buffers 414; and a bus master interface 416 including storage devices 418, all coupled to the processor 400 through a local bus 420. The bus master interface 416 enables the processor 400 to gain control of the bus 208 for accessing and controlling one or more slave devices. Preferably, the storage devices 418 are latches or buffers, such as 74AC244 buffers by TI or the like.

FIG. 5 is a state diagram illustrating transitions between the states of the bus 208, where states ST00, ST10, ST11 and ST01 preferably occur in order as shown in Table I and FIG. 5. Thus, the bus 208 is initially in state ST00 when idle, and remains in state ST00 during arbitration and to identify a slave device. Arbitration is described more fully below. The bus master winning the arbitration in state ST00 asserts the slave identification number SS[3:0] on signals B[3:0] while still in state ST00 to identify the slave device to be accessed. The winning bus master then transitions the state signals ST1 and ST0 to control the state transitions. In particular, the bus master asserts state signal ST1 to transition the bus to state ST10 for the first address phase. The WR signal is asserted on B[7] and the first portion of the address, or A[6:0], is asserted on the bus signals B[6:0] by the bus master in state ST10. Then the bus master asserts the ST0 state bit to transition the bus to state ST11 for the second address phase, where the bus master also asserts the address signals A[13:7]. The identified slave device may assert the BSY* signal on B[7] low during state ST11 if the slave device is busy decoding the address. The slave device negates the BSY* signal to allow transition to state ST01 for the data phase. The bus master then asserts the ST1 state bit low to transition to state ST01 for a data phase, and then asserts the ST0 state bit low to transitions back to state ST00 to indicate the cycle is complete. The bus 208 is once again idle and ready for another cycle.

It is noted that only one of the individual state bit signals ST1 and ST0 transitions at a time between any two consecutive states, which assures glitch free state transitions. Also, the state bit ST0 tracks the state bit ST1, so that ST0 is a sampled version of ST1, thereby simplifying a state machine implementation.

The bus 208 may be operated in an asynchronous manner so that a separate clock signal or timing reference is not required. For an asynchronous embodiment, each of the bus master and slave devices include state and data decode logic for determining the current state and transitions to the next state. In the preferred embodiment, however, a separate clock signal referred to as CLK is provided (FIGS. 6, 7) on the bus 208 for synchronizing communications and for defining state transitions. The CLK signal preferably operates at a frequency of approximately 8 MHz.

Table I and FIG. 5 illustrate that 14 binary address signals and 8 data signals are used for addressing 16 KB of data for each slave. Of course, additional bus signals could be provided for addressing a greater data space and/or more data during each cycle. In the preferred embodiment, the bus 208 includes the CLK clock signal and each bus cycle includes at least seven clock periods to complete. State ST00 is preferably three CLK cycles in duration, including two clock cycles for arbitration and one clock cycle for slave device decoding. One CLK cycle is used by each of the remaining states ST10, ST11 and ST01, and a final CLK cycle is used to drive the B[7:0] data signals to FFh during one idle state ST00. A bus master may insert additional CLK cycles or wait states as desired, and the slave device may require additional CLK cycles during state ST11 to decode or latch the address. In the preferred embodiment, however, each bus cycle completes in seven CLK cycles and the BSY* signal is optional. If a CLK frequency of 8 MHz is used, a data throughput rate of approximately 1.14 MB is achieved if each bus cycle is 7 CLK cycles.

In one embodiment, up to 16 slots are defined, each for receiving either a bus master or a slave or a combination of both, for a total of 32 devices. Four binary signals MRQ[3:0] are used to identify the bus masters during arbitration and four binary signals SS[3:0] are used to identify the slave devices. The id numbers may be hard coded to the physical slots, such as the slots 202a–l, or they may be programmable and independent of physical slots. Thus, for example, bus master 9 has an id number of MRQ[3:0]=1001b and slave device 8 has an id number SS[3:0]=1000b. The ARB* signal remains negated high in state ST00 when the bus 208 indicating that participation in bus ownership is allowed. One or more bus masters on the bus 208 initiate an arbitration cycle by asserting the ARB* signal low after sampling it high in state ST00. In the next CLK cycle, the ARB* signal is held low by one or more bus masters indicating that only those bus masters that asserted the ARB* signal in the prior CLK cycle are involved in the arbitration and may gain control of the bus 208.

The arbitration process is preferably two CLK cycles in duration beginning with the rising CLK edge after the ARB* signal was driven low. The two arbitration CLK cycles include four separate phases 3, 2, 1 and 0 defined between consecutive transitions of the CLK signal. Thus, phase 3 occurs between the first rising edge and the next falling edge of the CLK signal, phase 2 follows until the next rising edge of the CLK signal, and so on. During each of these phases, certain ones of the participating bus masters assert one or more of their MRQ[3:0] signals to compete for ownership of the bus 208. In the preferred embodiment, the bus master with the lowest MRQ[3:0] value wins, so that bus master zero with an id number of 0h always takes precedent if arbitrating, and bus master 15 decimal (Fh, hexadecimal) has lowest priority. The bus data signals B[7:0] are preferably pulled high through pullup resistors if not otherwise asserted low.

In a first arbitration embodiment, the participating bus masters with MRQ[3]=0 in the first phase 3 drive bus signal B[3] low and hold it low until the end of the last phase 0. During phase 3, all participants compare their MRQ[3] value with the B[3] value asserted on the bus 208. All participating bus masters with a different MRQ[3] than that of B[3] lose and do not participate further in the arbitration. During the next phase 2, the remaining participants having matched MRQ[3]=B[3] and with MRQ[2]=0 drive B[2] low and hold it low until the end of phase 0. During phase 2, the remaining participants compare their MRQ[2] value with the B[2] value on the bus 208. Again, only those bus masters with matching MRQ[2] and matching MRQ[3] continue participating in the arbitration. During the next phase 1, each remaining bus master with matching MRQ[3] and matching MRQ[2]=B[2] and with MRQ[1]=0 drive B[1] low and hold it low until the end of phase 0. During phase 1, remaining participants compare their MRQ[1] value with the B[1] value on the bus 208. During the final phase 0, each remaining bus master with matching MRQ[3] and matching MRQ[2] and MRQ[1]=B[1] and with MRQ[0]=0 drive B[O] low and hold it low until the end of phase 0. During phase 0, all remaining participants compare their MRQ[3:0] id number with value asserted on the B[3:0] signal on the bus 208. The bus master with matching MRQ[3:0] wins the arbitration and assumes control of the bus 208.

The goal with the above-described arbitration process is that the bus master with the lowest MRQ[] value, which is the id or slot number, wins control of the bus 208. The last comparison during phase 0 to determine the winning bus master requires some setup time to latch bus ownership. This is possible with more expensive components capable of operating at relatively high frequencies. However, the timing becomes relatively tight for less expensive implementations, such as programmable array logic (PAL) or PAL-based logic. If timing is too tight for the particular logic used, an additional CLK cycle could be inserted. This, however, slows down the process and somewhat reduces potential data throughput. Another solution, as described below, is to compress the arbitration process into two CLK cycles to relax this timing requirement.

In a second arbitration embodiment, a total of twelve bus masters are defined having MRQ[3:0] id numbers 0h–5h, and 7h–Dh (hexadecimal). This is sufficient for a twelve-slot modular design, such as that shown in FIG. 2A. In this scheme, slots 6h and Eh are not allowed since assertions are not allowed in the final phase 0. Nonetheless, a bus master that would normally be at MRQ[3:0]=6h is re-defined to respond with MRQ[3:0]=Dh during arbitration. During each phase, bus masters with leading identification bits equal to a predetermined priority logic level assert the corresponding and consecutive B[3:0] signals to the priority logic state, where the opposite logic state represents a phase delay. In the preferred embodiment, the priority logic level is 0. It is noted however, that logical negation is contemplated where the priority logic level is 1. For priority logic level of 0, the bus masters with leading 0's assert the corresponding consecutive B[3:0] signals, where a "1" is generally considered a phase delay. In subsequent phases, remaining bus masters drive additional ones of the B[3:0] signals if their upper MRQ[3:0] signals equal to the opposite logic state match the corresponding B[3:0] signals.

In particular, in the first phase 3, participating bus masters with slot id numbers of 8h (1xxxb) or greater have MRQ [3]=1b and do not drive B[3]. Participating bus masters having slot id numbers of 4–7h (0xxxb) drive B[3] until the end of phase 0. If participating, bus masters 2h (0010b) and 3h (0011b) drive both B[3] and B[2] or B[3,2] until the end of phase 0. If participating, bus master 1h (0001b), drives B[3,2,1] (or B[3:1]) and bus master 0h (00001b), if participating, drives all signals B[3:0] until the end of phase 0.

During the remaining phases 2–0, participants compare their upper MRQ[] signals with corresponding bus signals B[] and continue participating and driving B[] signals only if there is a match. During phase 2, bus masters Ah (1010b) and Bh (1011b), if participating, drive B[2] if B[3] is high (a match). If B[3] is low, then the Ah and Bh bus masters drop out and do not participate further in the current arbitration. Bus master 9h (1001b) drives both B[2,1] if B[3] is high, and if not high, bus master 9h is out of the arbitration. Likewise, bus master 8h (1000b) drives B[2:0] if B[3] is high, but otherwise is out. Also, bus master 2h (0010b) drives B[0] if B[1] is high, but is otherwise out. It is noted that bus master 2h asserts B[0] early since if B[1] is high, then bus masters 0h and 1h are not participating. During phase 1, bus master Ch (1100b), if participating, drives B[1:0] if B[3:2] are both high, but otherwise is out; bus master Ah (1010b) drives B[0] if B[3,1] are both high, but is otherwise out; bus master Dh (1101b, substituting for 6h), drives B[1] if B[3,2] are high, but is otherwise out; bus master 5h (0101b) drives B[1] if B[2] is high, but is otherwise out; and bus master 4h (0100b) drives B[1:0] if B[2] is high, but is otherwise out. In the last phase 0, no new B[3:0] signals are driven. During phase 0, each remaining bus master compares its MRQ[3:0] id number with the B[3:0] signals and latches the result. The bus master having a matching MRQ[3:0] value wins the arbitration. In this manner, bus master 0h takes highest priority, and bus master 6h (with Dh as id number) has lowest priority.

FIGS. 6A and 6B illustrate an arbitration example according to the second arbitration embodiment just described. In FIG. 6A, two network slave devices 602 and 604 are plugged into slots 0010b and 0011b, respectively, of a chassis 600, which has bus 208 incorporated in its backplane. Four bus master devices 606, 608, 610 and 612 are plugged into slots 0100b, 0101b, 1000b, and 1010b, respectively, of the chassis 600. FIG. 6B is a timing diagram illustrating arbitration of the bus 208 between the above bus masters 606–612, where signals CLK, ARB*, ST1, ST0 and B[3:0] are plotted against time.

Initially, the bus 208 is idle in state ST00 and the ARB* and B[3:0] signals are all high. At a time T0, the bus masters 606–612 all assert the ARB* signal low. Arbitration begins at the next rising edge of the CLK signal at time T2, where phase P3 begins. Bus master 606 and 608 asserts B[3] low at about time T4 during phase P3, while bus masters 610–612 do not assert any of the B[3:0] signals. Phase 2 begins at time T6 at the next falling edge of the CLK signal. During phase 2, bus master 610 (id=1000b) detects that the B[3] signal is not high and drops out of the arbitration. Likewise, bus master 612 (id=1010b) detects that the B[3] signal is not high and drops out of the arbitration. Phase 1 begins at the next rising edge of the CLK signal at time T8. Bus master 606b detects that B[2] is still high indicating that there are no bus masters with ids of 0000b–0011b arbitrating for the bus 208. Thus, bus master 606 asserts the B[1:0] signals low at time T10. Meanwhile, bus master 608 detects that B[2] is still high during phase 1 and asserts the B[1] signal. Note that both bus masters 606 and 608 are asserting the B[1] signal, while only bus master 606 is asserting the B[0] signal. Phase 0 occurs between the next falling and rising edges of the CLK signal between times T12 and T14, respectively, where both remaining bus masters 606 and 608 compare their slot id numbers MRQ[3:0] with the bus signals B[3:0]. Since bus master 606 with MRQ[3:0]=B[3:0]=0100b, bus master 606 wins and assumes control of the bus 208 at time T14.

At about time T16, the ARB* signal is driven high by the bus master 606, which also asserts B[2] low and B[1] high identifying a slave device with a slot id number of 0010b. Since the slave device 602 has an id number of 0010b, it responds to the cycle on the bus 208 and retrieves the first part of an address during the next state ST10 of the bus 208. State St10 begins at the next rising edge of the CLK signal at time T18, and ends. at the next rising edge of the CLK signal at time T20.

In a third arbitration embodiment, the first phase 3 is the same as phase 3 of the second embodiment above. In particular, participating bus masters having slot id numbers of 4–7h drive B[3], 1h drives B[3–1], 0h drives B[3:0], and bus masters 2h and 3h drive both B[3,2] until the end of phase 0. During phase 2, bus master 2h drives B[0] if B[1] is high, but is otherwise out; bus master 4h drives both B[1:0] if B[2] is high, but is otherwise out; bus master 5h drives B[1] if B[2] is high, but is otherwise out; bus master 8h drives B[2:0] if B[3] is high, but is otherwise out; bus master 9h drives B[2:1] if B[3] is high, but is otherwise out; and bus masters Ah and Bh drive B[2] if B[3] is high, but are otherwise out. During phase 1, bus master 6h drives B[0] if both B[2, 1] are high, but is otherwise out; bus master Ah drives B[0] if B[3,1] are high, but is otherwise out; bus master Ch drives B[1:0] if B[3:2] are high, but is otherwise out; bus master Dh drives B[1] if B[3,2] are high, but is otherwise out; and bus master Eh drives B[0] if B[3:1] are high, but is otherwise out. In the last phase 0, no new B[3:0] signals are driven, and each remaining bus master compares its MRQ[3:0] id number with the B[3:0] signals and latches the result. The bus master having a matching MRQ[3:0] value wins the arbitration. In this manner, bus master 0h takes highest priority, and bus master Eh has lowest priority.

In the following CLK cycle after arbitration according to any of the embodiments described above, the winning bus master asserts the slot id number SS[3:0] on the B[3:0] signals of the bus 208 of a slave device it wishes to access while still in state ST00. The addressed slave device may have the same slot id number as the bus master. Further, in the preferred embodiment with only 12 slots and slot numbers, a slot id number of Eh, or 1110b, is defined as a global write, where all of the slave devices decode the address and retrieve the data from the bus 208. As described previously, the bus master then steps through the remaining states in order, and the addressed slave device(s) responds to the cycle. The slave devices respond to the bus cycle by latching the B[3:0] signals during the third CLK cycle of state ST00, which latching should occur during the ST00 to ST01 transition.

The addressed slave device decodes state ST10 and preferably includes a transparent latch to store the WR signal and the address bits A[6:0]. It is noted that the A[7] address bit could be grouped with the A[6:0] address bits, as would be considered conventional. In the preferred embodiment, however, WR is grouped with A[6:0] to eliminate the need for every slave device to provide a latch for receiving information in the state ST11. Those slave devices with a smaller address space, A[6:0], suffice, where WR is latched into the same 8-bit chip. In the state ST 11, the slave device latches A[13:8] if those address bits are used. The slave device then begins its access and drives the BSY* signal within a setup requirement, if necessary. When the slave device is ready to transition into the state ST01, it negates the BSY* signal, if asserted. After a transition from states ST 11 to ST01, the A[13:0] signals are latched and the slave device is ready to accept data, if a write cycle is indicated, or to supply data, if a read cycle is indicated by the bus master. In state ST01, a latched version of the WR signal is used by the slave device to determine the direction of the data. After the transition from state ST01 to ST00, the slave device stops driving data for read cycles or latches the bus data signals B[7:0] for write cycles. Again, a slot id number of Eh is global and all slave devices present retrieve the data from the bus 208 during the global write cycle.

Figure 7:
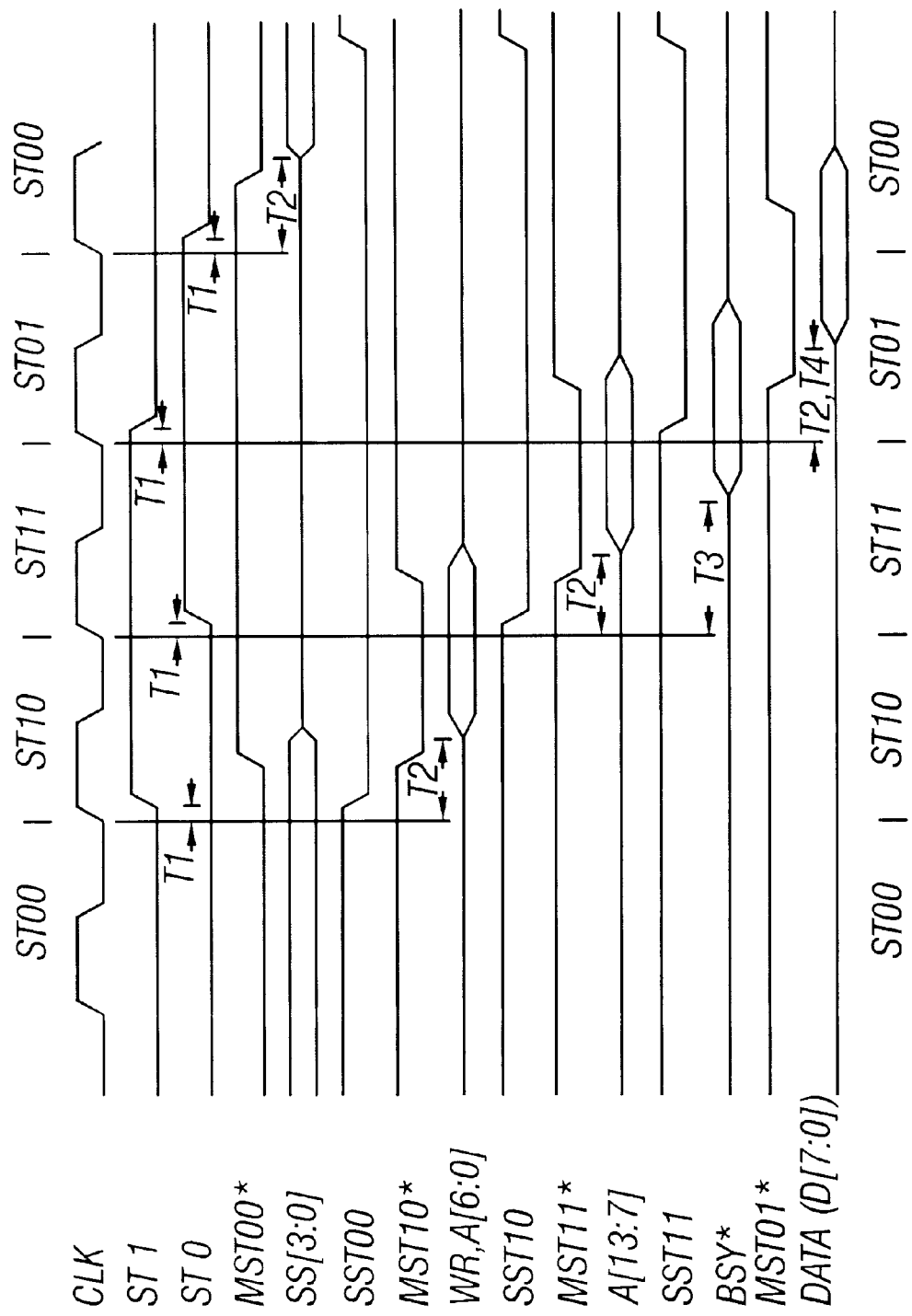
FIG. 7 is a timing diagram illustrating operation of a management communication bus according to the present invention.

FIG. 7 is a timing diagram illustrating operation of the management communication bus 208. Each of the states ST00–ST01 are defined relative to transitions of the CLK signal. T1, T2, T3 and T4 represent propagation delays. Ti is the propagation delay of each state bit from the rising edge of the CLK signal. T2 is the propagation delay of the B[7:0] signals from the rising edge of the CLK signal when the bus master drives data. T3 is the propagation delay of BSY* and the B[7] signal from the rising edge of the CLK signal when the slave device drives the BSY* signal. T4 is the propagation delay of read data B[7:0] from the rising edge of the CLK signal when the slave device drives data. As described previously, the signals SS[3:0], WR and A[6:0], BSY* and A[13:7] and the data signals D[7:0] are asserted on respective ones of the B[7:0] signals during corresponding states. For example, the SS[3:0] and D[3:0] are both asserted on the B[3:0] signals, though in different states of the bus 208, so that there is no bus contention.

Preferably, each bus master includes a set of four buffers, such as the storage devices 418, each having a corresponding enable signal MST00*, MST10*, MST11* and MST01*, respectively. The bus master asserts the MST00* signal while in state ST00 to enable a ST00 state buffer to drive the SS[3:0] signals. The bus master asserts the MST10* signal while in state ST10 to enable a ST10 state buffer to drive the WR and A[6:0] signals. The bus master asserts the MST11* signal while in state ST11 to enable a ST11 state buffer to drive the A[13:7] signals. The bus master asserts the MST01* signal while in state ST01 to enable a ST01 state buffer to write or read the D[7:0] signals. Also, each slave device includes a set of four latches, such as the storage devices 301, each having a corresponding enable signal SST00*, SST10*, SST11* and SST01*, respectively. The slave device asserts the SST00* signal while in state ST00 to enable a ST00 state latch to latch the SS[3:0] signals. The slave device asserts the SST10* signal while in state ST10 to enable a ST10 state latch to latch the WR and A[6:0] signals. The slave device asserts the SST11* signal while in state ST11 to enable a ST11 state latch to latch the A[13:7] signals. The slave device asserts the SST01* signal while in state ST01 to enable a ST01 state latch to assert or read the D[7:0] signals.

It is now appreciated that a management communication bus according to the present invention enables communication between a plurality of network devices for purposes of control, configuration, checking status, monitoring statistical information and any other management functions. The bus is preferably multiplexed with at least two state signals defining at least three, and preferably four states, where a first state is defined for arbitration and bus slave identification, second and a third states are defined for cycle definition and for asserting an address, and a fourth state is defined for a data cycle. Eight bus data signals are preferably included for defining up to 32 signals, where the definition of the bus data signals depends upon the particular state of the bus as defined by the state signals. The bus is a multimaster bus since several bus masters arbitrate for the bus during the first state, where several of the bus data signals are used for identifying the participating bus masters. The winning bus master then identifies a slave device using the bus data signals during a last cycle of the first state. The bus master then steps through several successive states and asserts address and cycle definition signals on the bus. The slave respondingly latches the address and determines from the cycle definition whether the cycle is a read or a write cycle.

In this manner, the bus is memory-mapped, where each bus master simply identifies an address to configuration registers within the slave device and asserts data to program or re-configure the accessed slave device. Also, the bus master monitors the slave device by perform read cycles to status and/or memory within the slave to access status information of the slave device or statistical data that the slave device is collecting. The memory-mapped configuration eliminates the overhead associated with encoding and decoding packetized data between the management portions of the network devices. In the preferred embodiment, only ten pins are included on the bus, including two state signals and eight data signals for a cost-effective solution. Also, a clock signal is preferably included for synchronizing state transitions of the bus. This provides a management solution that approximately one-third the cost of a management scheme using ARCnet, yet with a higher data throughput. Thus, a management communication bus according to the present invention enables management of network devices at the desired data throughput without adding significant cost to a network system.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A management communication bus for a plurality of network devices of a network system, the network system including at least one bus master device and at least one slave device, said management communication bus comprising:

a number of encoded bus state signals incorporated on the management communication bus, where said number is greater than one, that collectively define more than said number of bus states including bus states for arbitration, for slave identification, for asserting an address and for asserting data corresponding to said address;

a plurality of bus data signals, incorporated on the management communication bus, for transferring information data depending upon said bus states, said information data including bus request, slave identification, said address and said data; and each bus data signal within said plurality of bus data signals has a definition, at least one of said definitions is operable to be redefined during a change of at least one of said number of bus states.

2. The management communication bus of claim 1, further comprising:

a bus clock signal for synchronizing bus state transitions.

3. The management communication bus of claim 2, wherein said bus clock signal has a frequency of approximately eight megahertz.

4. The management communication bus of claim 1, wherein said number of encoded bus state signals includes at least two bus state signals that collectively define at least four bus states, said four bus states including first and second address states for asserting first and second address portions of said address, respectively.

5. The management communication bus of claim 4, wherein a bus master device asserts a cycle definition signal on one of said plurality of bus data signals during one of said first and second address states indicating whether the operation is a read cycle and whether the operation is a write cycle.

6. The management communication bus of claim 4, wherein said plurality of bus data signals includes at least eight data signals.

7. The management communication bus of claim 4, wherein a slave device asserts a busy signal on one of said plurality of bus data signals to indicate that the slave device is busy during said second address state, and wherein said management communication bus stays in said second address state until the slave device deasserts said busy signal.

8. The management communication bus of claim 1, wherein said number of encoded bus state signals includes only two bus state signals and wherein said bus data signals includes eight data signals for a total of ten bus signals.

9. The management communication bus of claim 1, wherein only one of said number of encoded bus state signals transitions at a time between consecutive bus states of said more than said number of bus states.

10. A management communication bus system, comprising:

a bus, including:

a number of encoded bus state signals, where said number is greater than one, that collectively define more than said number of bus states including a first bus state for arbitration and slave device identification, a second bus state for asserting an address and a third bus state for asserting data corresponding to said address; and a plurality of bus data signals for transferring information data depending upon said bus states, said information data including bus request and slave identification information during said first bus state, said address during said second bus state and said data during said third bus state;

at least one bus master device coupled to said bus; and at least one slave device coupled to said bus.

11. The management communication bus system of claim 10, wherein said number of encoded bus state signals collectively define at least four bus states wherein said second bus state includes first and second address states for asserting first and second address portions, respectively.

12. The management communication bus system of claim 10, wherein:
said at least one bus master device includes an interface for asserting said number of encoded bus state signals to transition between said more than said number of bus states; and
wherein said bus master interface asserts said plurality of bus state signals and a bus data signal to initiate a first bus state to gain control of said bus and asserts said plurality of bus data signals to identify said at least one slave device, asserts said number of encoded bus state signals to advance to a second bus state and asserts said address on said plurality of bus data signals and asserts said number of encoded bus state signals to advance to a third bus state to perform a data cycle.

13. The management communication bus system of claim 12, wherein said bus master interface asserts a cycle definition signal during said second bus state indicating the direction of said data between said at least one bus master device and said at least one slave device.

14. The management communication bus system of claim 13, wherein said at least one slave device comprises:
an interface for detecting said cycle definition signal and for asserting data during a read cycle and for retrieving data during a write cycle; and
memory coupled to said interface for storing said data.

15. The management communication bus system of claim 10, further comprising:
a plurality of bus master devices coupled to said bus, each having an identification number with a predetermined priority; and
wherein each of said plurality of bus master devices includes an interface for asserting a binary equivalent of an identification number on said plurality of bus data signals to arbitrate for said bus, wherein a bus master device asserting a highest priority identification number gains control of said bus.

16. The management communication bus system of claim 15, wherein said first bus state is divided into multiple phases, wherein during each of said multiple phases, each bus master device having a corresponding logic bit being equal to a predetermined priority logic level asserts said corresponding logic bit on a corresponding one of said plurality of bus data signals and then compares its corresponding logic bit with said corresponding one of said plurality of bus data signals, and wherein during a final phase, a bus master device having an identification code matching corresponding ones of said plurality of bus data signals gains control of said bus.

17. The management communication bus system of claim 15, wherein said first bus state is divided into multiple phases corresponding to the number of bits of said binary equivalent of said identification number, wherein during each of said multiple phases, each bus master device having a leading identification bit equal to a predetermined priority logic level asserts said leading identification bit and all consecutive identification bits equal to said predetermined priority logic level on corresponding ones of said plurality of bus data signals, and in each subsequent phase, each bus master drives additional identification bits if its more significant identification bits are equal to an opposite logic state as said predetermined priority logic level and match corresponding ones of said plurality of bus data signals.

18. The management communication bus system of claim 10, further comprising:

a plurality of slave devices each associated with one of a plurality of unique identification number; and
wherein said at least one bus master device includes an interface for asserting one of said plurality of unique identification numbers on said plurality of bus data signals to access a corresponding one of said plurality of slave devices.

19. The management communication bus system of claim 18, wherein said bus master interface asserts a global identification number on said plurality of bus data signals to access all of said plurality of slave devices.

20. The management communication bus system of claim 10, wherein said at least one slave device includes an interface for asserting a busy signal on one of said plurality of bus data signals during said second bus state to delay said third bus state.

21. A network system, comprising:
a chassis including a plurality of slots;
a plurality of slot connectors mounted to said chassis, each one of said plurality of slot connectors aligned with a corresponding one of said plurality of slots;
a management communication bus coupled to each of said plurality of slot connectors, said bus comprising:
a number of encoded bus state signals, where said number is greater than one, that collectively define more than said number of bus states including an identification state for arbitrating for control of said bus and for asserting a slave identification number, an address state for asserting an address and a data state for asserting data corresponding to said address; and
a plurality of bus data signals for transferring information data depending upon said bus states, said information data including bus request and slave identification information during said identification state, said address during said address state and said data during said data state; and
each bus data signal within said plurality of bus data signals has a definition, at least one of said definitions is operable to be redefined during a change of at least one of said number of bus states; and
at least one module for plugging into any one of said plurality of slots of said chassis including a module connector for coupling with a corresponding one of said plurality of slot connectors for interfacing said at least one module to said bus.

22. The network system of claim 21, wherein said at least one module includes a bus master device for asserting said number of encoded bus state signals to transition between said more than said number of bus states of said bus.

23. The network system of claim 22, wherein said bus master device includes an interface to assert said number of encoded bus state signals and said plurality of bus data signals to initiate said identification state and gain control of said bus, to assert said slave identification number, to advance to said address state and to assert an address, and to advance to said data state to perform a data cycle.

24. The network system of claim 21, wherein said at least one module includes a slave device for monitoring said plurality of bus data signals, for retrieving an address and for participating in a data cycle during said data state.

25. The network system of claim 24, wherein said slave device includes:
an interface for detecting a cycle definition signal and for asserting data during a read cycle and for retrieving data for a write cycle; and
memory coupled to said interface for storing said data.

26. The network system of claim 21, wherein said at least one module comprises:
- a bus master device for asserting said number of encoded bus state signals to transition between said more than said number of bus states of said bus; and
- a slave device for monitoring said plurality of bus data signals, for retrieving an address and for participating in a data cycle during said data state.

27. The network system of claim 21, wherein said at least one module comprises:
- a first module including a bus master device for asserting said number of encoded bus state signals to transition between said more than said number of bus states of said bus; and
- a second module including a slave device for monitoring said plurality of bus data signals, for retrieving an address and for participating in a data cycle during said data state.

28. The network system of claim 27, wherein said second module further comprises:
- a network device, including:
    - a media interface device; and
    - port control logic coupled to said media interface device and said slave device, said port control logic including a plurality of configuration and status registers.

29. The network system of claim 28, wherein said slave device further comprises:
- a processor coupled to said port control logic; and
- a slave interface coupled to said processor and said bus.

* * * * *